Patented Aug. 10, 1948

2,446,759

UNITED STATES PATENT OFFICE 2,446,759

OPEN-HEARTH PROCESS

Frederick J. Griffiths, Massillon, Ohio, assignor to Chromium Mining and Smelting Corpn., Limited, Sault Ste. Marie, Ontario, Canada, a corporation of Canada No Drawing. Application October 22, 1945,
Serial No. 623,872

6 Claims. (Cl. 75—57)

This invention relates to metallurgy and has for an object the provision of certain improvements in steel production operations. More particularly, the invention contemplates the provision of an improved method or process for removing impurities such, for example, as carbon and sulphur, by means of an overlying slag, from molten metal undergoing treatment in a suitable furnace for the production of steel of a desired composition with respect to such elements. A specific object of the invention is to provide certain improvements in the method or process of treating steel in an open hearth furnace which employs a molten bath of steel beneath and in contact with a layer of molten slag comprising calcium oxide and iron oxide. Accordingly, the invention will be described more particularly hereinafter with respect to its application to basic open hearth furnace processes.

According to some heretofore customary processes, steel is produced in basic open hearth furnace processes by first melting a charge comprising a basic material like lime (CaO) or limestone (CaCO$_3$) or both, scrap iron or steel and pig iron, solid or molten or both, and, thereafter, subjecting the molten furnace charge to the action of iron oxide, in the form of iron ore or mill scale, for example, and a basic material such as lime or limestone or dolomite, thus forming a furnace charge comprising a molten bath of steel beneath and in contact with a layer of molten basic slag comprising calcium oxide and iron oxide.

The slag functions to cover the bath of metal and inhibit or reduce oxidation of the molten metal therebeneath by means of air. The iron oxide of the slag functions to oxidize and eliminate carbon contained in the molten metal. Lime contained in basic slags reacts with sulphur contained in the metal forming calcium sulphide (CaS) which enters the slag.

The slags employed in basic open hearth processes usually contain at least two molecules of basic material such as lime for each molecule of acid material such as silica.

A heat may melt under varying slag conditions, ranging from "heavy and mushy" through "good lime" to "lean" and "raw." The lime sometimes comes up in sintered aggregates known as floaters which are difficult to flux and put into solution. Mushy slags are those in which the lumps of calcined lime pass through a stiff, pasty stage similar to corn meal mush as they go into solution. Such slags have an abundance of lime and usually have a moderate to high iron oxide content. They will shape up by themselves in time, but they are likely to be too viscous for rapid working.

When most of the lime is up, the slag will be heavy and inert for a time with resulting poor bath action, making it difficult to get the bath on the boil and to drive in heat when it is most needed for slag shaping. Therefore, in the earlier periods, including parts of the ore boil and the earlier vigorous lime boil, an effort is made to maintain a maximum heat input so as to obtain just a little extra margin of temperature in the bath when the lime is up and the melting completed.

In estimating the composition of a slag, both the basicity of the already-fluid portion of the slag and the amount of lime available to go into solution must be considered. If sufficient lime is present, the problem is only one of getting it into solution. Low-iron slags may be fluxed by the addition of fine ore or mill scale if the carbon content of the bath is high enough to tolerate the "kick" which the addition will cause ultimately in the rate of carbon elimination. Any additional lime required is added in the form of burnt lime as early as the need can be estimated.

Raw slags are those which contain a definite shortage of lime from the charge. Burnt lime or limestone may be added to supply the deficiency. High carbon contents of the bath frequently are associated with raw melts, and, in addition to lime, hard ore, fine ore, or mill scale may be used. The two latter remain in the slag, and their effect on the bath does not become apparent until some time later. Hard ore reacts primarily on the bath but also raises the iron oxide content of the slag temporarily and helps to flux the lime in the slag to some extent.

Burnt lime probably is the most important corrective addition made to the open hearth slag. It is difficult to dissolve in the slag and its solution usually requires considerable time, especially when made to an immature slag. Therefore, in order to obtain the full effect of any burnt lime fed to the slag, the additions are made as early as possible, sometimes before the heat is entirely melted. When the slag is heavy and lumpy, feeding of large amounts of burnt lime at a time is poor practice since the addition would cause the slag to become too thick to allow proper bath action. Burnt lime sometimes is added just prior to or simultaneously with an ore addition. In such a case, the stirring action of the ore boil and the fluxing action of the abnormal iron oxide in the slag would hasten the solution of the lime.

The present invention is based on my discovery that the addition to a basic open hearth slag of a non-carbonaceous reducing agent such, for example, as silicon or aluminum, particularly when used in conjunction with an oxidizing agent like an alkali metal chlorate (sodium chlorate) or an alkali metal nitrate (sodium nitrate), results in modification of the characteristics of the slag and promotion of a reaction between carbon contained in the steel and iron oxide contained in the steel and slag. According to the preferred method of the invention, the non-carbonaceous reducing agent and the oxidizing agent are employed in the form of an intimate admixture capable of reaction exothermically upon ignition to generate a substantial quantity of heat. A preferred exothermic reaction mixture employed in carrying out a method or process of the invention is one comprising, or even consisting essentially of, ferrosilicon and sodium nitrate in which the ferrosilicon is present in such amount and proportion as to provide silicon for reaction with all of the sodium nitrate and with iron oxide and calcium oxide of the slag with the production of a substantial quantity of heat.

The following examples illustrate types of reaction mixtures which have been employed effectively in carrying out a method or process of the invention (proportions are given in parts by weight):

*Example I*

| | Parts |
|---|---|
| Sodium nitrate | 145 |
| Ferrosilicon (57% Si) (sold in commerce under the trade name SIL-X 145) | 1000 |

*Example II*

| | Parts |
|---|---|
| Sodium nitrate | 75 |
| Ferrosilicon (57% Si) (sold in commerce under the trade name SIL-X 75) | 1000 |

Reaction mixtures of the types illustrated above preferably are employed in the form of small agglomerates in which the ferrosilicon is present in the form of small particles (preferably minus 65-mesh) which are intimately associated with and bonded together by means of the sodium nitrate. Agglomeration is effected by mixing the particles of ferrosilicon and finely divided sodium nitrate intimately while moistened with water in amount equal in weight to about two to three percent of the weight of the mixture, molding the resulting plastic mixture into masses of suitable sizes, heating the masses carefully to drive off water and melt the sodium nitrate in place, and cooling to effect solidification and crystallization of the sodium nitrate.

Addition of a quantity of reaction mixture of a type of those illustrated above to a basic slag in an open hearth furnace results in rapid shaping-up of the slag. Addition of the reaction mixture after completion of melting when the slag contains sintered agglomerates, which normally are difficult to put into solution, results in rapid solution of the agglomerates with the production of a substantially homogeneous, fluid slag which may be worked rapidly. Addition of a quantity of reaction mixture to the slag after addition of lime, which normally goes into solution only slowly and with difficulty, results in rapid solution of the added lime with the production of a fluid, highly reactive slag.

Rapid solution of lime in the form of lumps or aggregates or solid unreacted particles of any kind provides for effective and efficient control of the steel-making process and reduces the time required for carrying the process to completion. A slag may contain as components basic and acidic materials in the proportions required for forming a highly basic slag, yet, unless the components are properly in solution, the slag may be only slightly basic or even substantially neutral. That portion of the slag burden which is not in solution is substantially wholly ineffective as a component or constituent of the slag. The method or process of the invention insures complete or substantially complete solution of the slag components or constituents with the production of a substantially homogeneous, fluid and highly reactive slag. Substantially complete solution of the slag components provides for economy in operations by permitting the use of smaller amounts of lime, since all lime used is used effectively, and by the consequent use of smaller slag volumes with resulting economy in heating and handling. The use of exothermic reaction mixtures in a process of the invention is also conducive to economy in at least partially eliminating the necessity for high heat in-put through fuel consumption for shaping-up the slag.

The following example illustrates comparative results obtained in carbon elimination when employing normal or heretofore customary methods or processes and processes of the invention using exothermic reaction mixtures of the types illustrated above. (The normal processes were carried out under conditions substantially identical with those of the processes of the invention except for the addition of the exothermic reaction mixtures. The results obtained in the normal processes are illustrated by the data set forth in items 1 and 2, the remaining items show data obtained in carrying out processes of the invention):

| | Initial Carbon Content, (Per cent) | Final Carbon Content, (Per cent) | Percent Reduction Per Hour |
|---|---|---|---|
| (1) | .85 | .03 | .21 |
| (2) | .63 | .087 | .16 |
| (3) | .69 | .067 | .31 |
| (4) | .72 | .22 | .50 |
| (5) | .75 | .22 | .53 |
| (6) | .74 | .095 | .26 |
| (7) | .88 | .08 | .36 |
| (8) | 1.54 | .04 | .48 |
| (9) | .21 | .04 | .37 |
| (10) | .20 | .07 | .39 |
| (11) | .45 | .06 | .36 |
| (12) | .55 | .07 | .34 |
| (13) | .66 | .20 | .37 |
| (14) | .52 | .05 | .33 |
| (15) | .31 | .08 | .28 |
| (16) | .43 | .06 | .26 |
| (17) | .32 | .06 | .26 |
| (18) | .43 | .06 | .26 |

When added to molten slag on the surface of a molten bath of metal an exothermic reaction mixture of the type illustrated above becomes ignited, the sodium nitrate reacts with a portion of the silicon of the ferrosilicon, generating heat which effects a local temperature rise in the slag and melts the remainder of the ferrosilicon. The exothermic reaction appears to initiate a chain of progressive exothermic reactions, the silicon of the molten ferrosilicon reacting with the iron oxide and the calcium oxide of the slag, producing heat and calcium or calcium silicide which, in turn, reacts with ferric oxide, producing additional substantial quantities of heat, and the uncombined lime going into solution and producing heat by virtue of solution and chemical combination with acidic components of the slag. Furthermore, the resulting increased temperature with increased fluidity of the slag promotes more effective solution or dispersion of iron oxide in the metal with consequent provision for more effective reaction of the carbon of the metal with the iron oxide. Another result of reaction of the components of the exothermic reaction mixture is the production of an alkali metal oxide (sodium oxide) which is capable of modifying the surface tension of the slag and increasing its wetting capacity and thus providing for more thorough contact of molten slag and molten steel and promoting a reaction between carbon contained in the steel and iron oxide contained in the steel and slag. The effectiveness of the sodium oxide probably is attributable to the fact that it is a product resulting from decomposition of a more complex compound and is, in effect, in a nascent state when it becomes available for reaction with other components or constituents of the slag such, for example, as silica with which it forms sodium silicate.

Exothermic reaction mixtures are employed in processes of the invention in relatively small amounts. The non-carbonaceous reducing agent, such as silicon, in the added reaction mixture preferbly is present in amount sufficient to react with all of the oxidizing material of the mixture and with iron oxide of the slag and generate a substantial quantity of heat but insufficient to penetrate the slag and enter the molten steel in substantial amount. Normally, amounts of exothermic reaction mixtures equal in weight to about one to three percent (1.0 to 3.0%) of the weight of the slag may be employed satisfactorily in carrying out a method or process of the invention. Any suitable amounts of exothermic reaction mixtures may be employed in carrying out a method of the invention.

In my copending applications Serial No. 665,349, filed April 26, 1946, and Serial No. 666,832, filed May 2, 1946, I have described and claimed processes employing reaction mixtures of the types of those described herein for blocking heats and for the two-fold purpose of controlling slag characteristics and blocking heats.

I claim:

1. The method of producing steel which comprises forming a bath of molten metallic iron in a furnace, subjecting the molten metal of the bath to the action of iron oxide and calcium oxide to remove carbon and such impurities as silicon and sulphur and form a layer of molten slag comprising calcium oxide and iron oxide above and in contact with the upper surface of the molten metal, and adding to the layer of slag in the furnace an exothermic reaction mixture capable of yielding by reaction upon ignition an alkali metal oxide capable of reacting with at least one component of the slag to modify the characteristics of the slag and promote a reaction between carbon contained in the molten metal and iron oxide contained in the molten metal and slag.

2. The method of producing steel which comprises forming a bath of molten metallic iron in a furnace, subjecting the molten metal of the bath to the action of iron oxide and calcium oxide to remove carbon and such impurities as silicon and sulphur and form a layer of molten slag over-lying and in contact with the upper surface of the molten metal, and adding to the slag layer over-lying the molten metal in the furnace an exothermic reaction mixture comprising ferrosilicon and sodium nitrate and capable of yielding upon ignition sodium oxide which modifies the surface tension of the slag and increases its capacity for wetting the molten metal and thus provides for more thorough contact of molten slag and molten metal and promotes a reaction between carbon contained in the molten metal and iron oxide contained in the metal and slag, silicon-containing material being present in the added reaction mixture in amount sufficient to react with all of the sodium nitrate of the mixture and with a portion only of the iron oxide of the slag and generate a substantial quantity of heat but insufficient to penetrate the slag and enter the molten metal in substantial amount, thereby to increase the temperature of the slag and the molten metal in contact therewith and to further promote a reaction between carbon contained in the molten metal and iron oxide contained in the metal and slag.

3. The method of reducing the carbon content of steel in an open hearth furnace process which comprises forming a bath of molten steel in an open hearth furnace, forming a layer of slag comprising calcium oxide and iron oxide above and in contact with the upper surface of the molten steel, and igniting in contact with the slag in the furnace an exothermic reaction mixture capable of yielding by reaction upon ignition sodium oxide capable of reacting with one or more components of the slag to modify the characteristics of the slag and promote a reaction between carbon contained in the steel and iron oxide contained in the steel and slag.

4. The method of reducing the carbon content of steel in an open hearth furnace process which comprises forming a bath of molten steel in an open hearth furnace, forming a layer of slag comprising calcium oxide and iron oxide above and in contact with the upper surface of the molten steel, and igniting in contact with the slag in the furnace an exothermic reaction mixture comprising sodium nitrate and non-carbonaceous reducing material and capable of yielding by reaction upon ignition sodium oxide capable of reacting with at least one component of the slag and modifying the characteristics of the slag to promote a reaction between carbon contained in the steel and iron oxide contained in the steel and slag.

5. The method of reducing the carbon content of steel in an open hearth furnace process which comprises forming a bath of molten steel in an open hearth furnace, forming a layer of slag comprising calcium oxide and iron oxide above and in contact with the upper surface of the molten steel, and igniting in contact with the slag in the furnace an exothermic reaction mixture comprising sodium nitrate and ferrosilicon and capable of yielding by reaction upon ignition sodium oxide capable of reacting with at least one component of the slag and modifying the characteristics of the slag to promote a reaction between carbon contained in the steel and iron oxide contained in the steel and slag.

6. The method of producing steel which comprises forming a bath of molten metallic iron in a furnace, adding slag-forming materials to the furnace to form a layer of molten slag comprising calcium oxide and iron oxide above and in contact with the upper surface of the molten metal, and promoting assimilation of the added slag-forming materials by the layer of slag, with the production of a modified layer of fluid slag of substantially uniform composition throughout and capable of readily wetting the upper surface of the metal of the molten bath, by adding to the layer of molten slag an exothermic reaction mixture comprising sodium nitrate and ferrosilicon, ferrosilicon being employed in amount sufficient to react with all of the sodium nitrate and with a portion only of the iron oxide contained in the slag to generate a substantial quantity of heat but insufficient to penetrate the layer of slag and enter the molten metal in substantial amount.

FREDERICK J. GRIFFITHS.

REFERENCES CITED

The following references are of record in the file of this patent:

UNITED STATES PATENTS

| Number | Name | Date |
|---|---|---|
| 1,532,052 | Greene | Mar. 31, 1925 |
| 2,361,627 | Herty | Oct. 31, 1944 |